United States Patent
Yoon et al.

(10) Patent No.: US 8,817,068 B2
(45) Date of Patent: Aug. 26, 2014

(54) DIGITAL HOLOGRAM IMAGE DISPLAY DEVICE

(75) Inventors: Minsung Yoon, Gumi-si (KR); Guensik Lee, Seoul (KR)

(73) Assignee: LG Display Co., Ltd., Seoul (KR)

(*) Notice: Subject to any disclaimer, the term of this patent is extended or adjusted under 35 U.S.C. 154(b) by 433 days.

(21) Appl. No.: 13/152,146

(22) Filed: Jun. 2, 2011

(65) Prior Publication Data

US 2012/0050459 A1 Mar. 1, 2012

(30) Foreign Application Priority Data

Aug. 31, 2010 (KR) .......................... 10-2010-0084910

(51) Int. Cl.
*H04N 13/00* (2006.01)
*G02B 27/42* (2006.01)
*G03H 1/22* (2006.01)
*G02B 27/22* (2006.01)

(52) U.S. Cl.
CPC ............ *G02B 27/22* (2013.01); *G03H 2222/34* (2013.01); *G03H 2223/14* (2013.01); *G02B 27/4205* (2013.01); *G03H 1/2294* (2013.01); *G03H 2210/30* (2013.01); *G03H 2222/46* (2013.01); *G03H 1/2205* (2013.01); *G03H 2222/18* (2013.01); *G03H 1/2286* (2013.01)
USPC ............... 348/40; 348/41; 348/739; 348/750; 348/760; 348/761; 348/762; 348/763; 348/764; 359/1

(58) Field of Classification Search
CPC ............. G03H 1/00; G03H 1/08; G03H 1/10; G03H 1/12; G03H 1/14; G03H 2001/0088; G03H 1/0005; G03H 1/2294; G03H 1/0011; G03H 1/0252; G03H 1/0256; G03H 1/0276; G03H 1/0808

USPC ........................................ 348/40, 41, 42–60
See application file for complete search history.

(56) References Cited

U.S. PATENT DOCUMENTS

| | | | | |
|---|---|---|---|---|
| 6,697,180 | B1 * | 2/2004 | Wilson et al. | 359/11 |
| 6,999,397 | B2 * | 2/2006 | Roh et al. | 369/103 |
| 7,239,594 | B2 * | 7/2007 | Edwards | 369/103 |
| 8,021,010 | B2 * | 9/2011 | Lin | 362/97.1 |
| 8,456,730 | B2 * | 6/2013 | Prucnal et al. | 359/279 |
| 2003/0039036 | A1 * | 2/2003 | Kruschwitz et al. | 359/707 |

(Continued)

FOREIGN PATENT DOCUMENTS

| | | |
|---|---|---|
| EP | 1 292 134 A2 | 3/2003 |
| GB | 2 456 170 A | 7/2009 |
| WO | WO 2009/050294 A2 | 4/2009 |
| WO | WO 2009/071546 A1 | 6/2009 |

*Primary Examiner* — Andy Rao
*Assistant Examiner* — Shan Elahi
(74) *Attorney, Agent, or Firm* — Birch, Stewart, Kolasch & Birch, LLP

(57) ABSTRACT

The present disclosure relates to a digital hologram display device in which the $0^{th}$ diffraction component is removed for optimizing the reproduction and replay of three-dimensional hologram video data. The present disclosure suggests a digital hologram image display device including a pattern generator generating holography interference patterns; a spatial light modulator receiving the holography interference patterns from the pattern generator and representing the holography interference patterns; a light source positioning at one side of the spatial light modulator and illuminating a reference beam to the spatial light modulator; an optical device controlling the reference beam to be collimated onto the entire surface of the spatial light modulator; and a diffusion sheet disposed between the light source and the spatial light modulator.

12 Claims, 6 Drawing Sheets

(56) References Cited

U.S. PATENT DOCUMENTS

| | | | |
|---|---|---|---|
| 2003/0071813 A1* | 4/2003 | Chiabrera et al. | 345/426 |
| 2004/0027629 A1* | 2/2004 | Wilson et al. | 359/11 |
| 2004/0156297 A1* | 8/2004 | Edwards | 369/103 |
| 2005/0030603 A1* | 2/2005 | Takemori et al. | 359/28 |
| 2005/0243389 A1* | 11/2005 | Kihara | 359/9 |
| 2006/0285352 A1* | 12/2006 | Kim | 362/558 |
| 2006/0290777 A1* | 12/2006 | Iwamoto et al. | 348/49 |
| 2007/0188857 A1* | 8/2007 | Slinger | 359/385 |
| 2007/0247630 A1* | 10/2007 | Herring | 356/458 |
| 2007/0285352 A1* | 12/2007 | Hwang et al. | 345/60 |
| 2010/0149311 A1* | 6/2010 | Kroll et al. | 348/40 |
| 2010/0253986 A1* | 10/2010 | Awatsuji et al. | 359/10 |
| 2010/0259804 A1* | 10/2010 | Buschbeck et al. | 359/34 |
| 2011/0002019 A1* | 1/2011 | Routley et al. | 359/9 |
| 2011/0149018 A1* | 6/2011 | Kroll et al. | 348/40 |

* cited by examiner

FIG. 3B
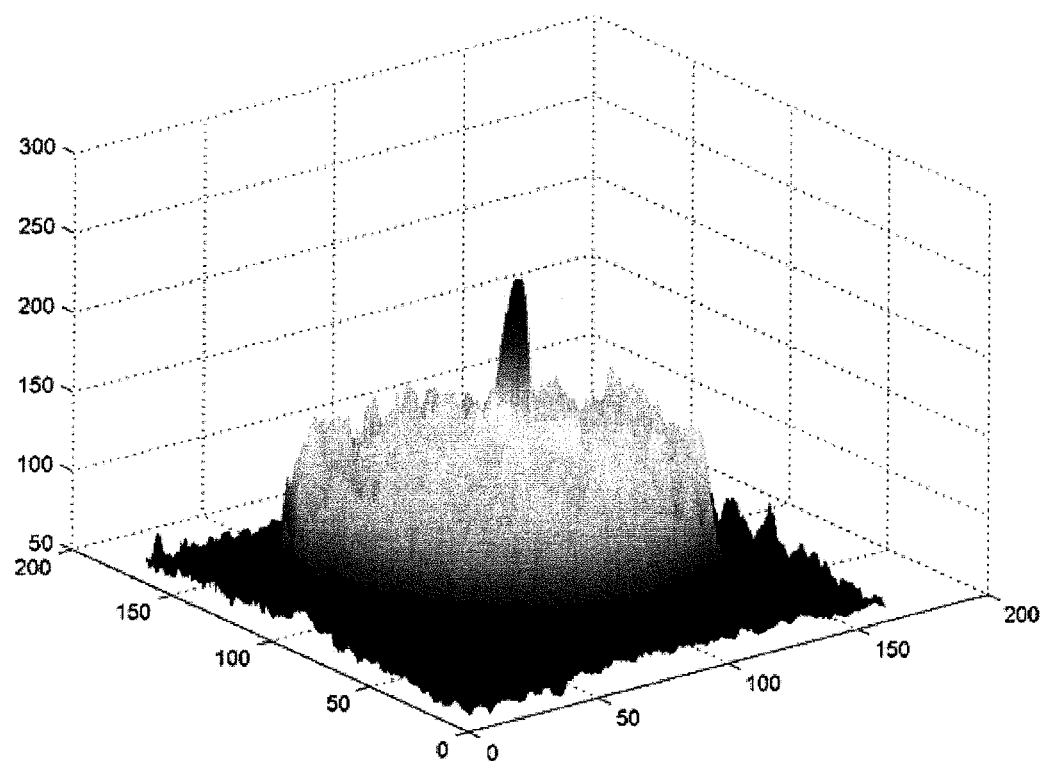

DIGITAL HOLOGRAM IMAGE DISPLAY DEVICE

This application claims the priority benefit of Korea Patent Application No. 10-2010-0084910 filed on Aug. 31, 2010, which is incorporated herein by reference for all purposes as if fully set forth herein.

BACKGROUND OF THE INVENTION

1. Field of the Invention

The present disclosure relates to a digital hologram display device for reproducing/replaying digital hologram video data for playing three dimensional video images. Particularly, the present disclosure relates to a digital hologram display device in which the $0^{th}$ diffraction component is removed for optimizing the reproduction and replay of the three-dimensional hologram video data.

2. Discussion of the Related Art

Recently, technologies and researches for making and reproducing the 3D (Three Dimensional) images/videos are actively being developed. As the media relating to the 3D image/video is a new concept for virtual reality, it can improve the visual information better, and it will lead to the next generation display devices. The conventional 2D image system merely suggests the image and video data to be projected into plan view, but the 3D image system can provide the full real image data to the viewer. So, the 3D image/video technologies are the True image/video technologies.

Typically there are three methods for reproducing 3D images/videos: the stereoscopy method, the holography method and the integral imaging method. Among them, the holography method is the most ideal method because it has an excellent visual autostereoscopic property without any fatigue of an observer.

To produce a recording of the phase of the light wave at each point in an image, holography uses a reference beam which is combined with the light from the scene or object (the object beam). If these two beams are coherent, optical interference between the reference beam and the object beam, due to the superposition of the light waves, produces a series of intensity fringes that can be recorded on standard photographic film. These fringes form a type of diffraction grating on the film, which is called the hologram. The central goal of holography is that when the recorded gratng is later illuminated by a substitute reference beam, the original object beam is reconstructed (or reproduced), producing a 3D image/video.

There is a new development of the computer-generated holography (or CGH) that is the method of digitally generating holographic interference patterns. A holographic image can be generated, e.g., by digitally computing a holographic interference pattern and printing it onto a mask or film for subsequent illumination by a suitable coherent light source. The holographic image can be brought to life by a holographic 3D display, bypassing the requirement to fabricate a "hardcopy" of the holographic interference pattern each time.

Computer-generated holograms have the advantage that the objects which one wants to show do not have to possess any physical reality at all. If holographic data of existing objects is generated optically, but digitally recorded and processed, and brought to display subsequently, this is termed CGH as well. For example, a holographic interference pattern is generated by a computer system and the generated pattern is sent to a spatial light modulator such as LCSML (Liquid Crystal Spatial Light Modulator), then the 3D image/video corresponding to the holographic interference pattern is reconstructed/reproduced by illuminating a reference beam to the spatial light modulator. FIG. 1 is a structural drawing illustrating a digital holography image/video display device using a computer-generated holography according to the related art.

Referring to FIG. 1, a computer 10 generates a holographic interference pattern of an image/video data to be displayed. The generated holographic interference pattern is sent to a SLM (Spatial Light Modulator) 20. The SLM 20, as a transmittive liquid crystal display device, can represent the holographic interference pattern. At one side of the SLM 20, a laser source 30 for generating a reference beam is located. In order to collimate a reference beam 90 from the laser source 30 onto the whole surface of the SLM 20, an expander 40 and a lens system 50 can be disposed, sequentially. The reference beam 90 out from the laser source 30 is illuminated to one side of the SLM 20 passing through the expander 40 and the lens system 50. As the SLM 20 is a transmittive liquid crystal display device, a 3D image/video 80 corresponding to the holography interference pattern will be reconstructed/reproduced at the other side of the SLM 20.

At this time, there are some components of the reference beam 90 which are not diffracted by the holographic interference pattern but just passing through the holographic interference pattern. These components are called the "DC component" or the "$0^{th}$ diffraction component." The $0^{th}$ diffraction component passing through the holographic interference pattern is superimposed with the reproduced images and causes the deteriorated image/video quality. Up to now, there are some researches for eliminating the $0^{th}$ diffraction component in the digital holography.

For example, there is one method in which the $0^{th}$ diffraction component is reduced by diffusing it using a concaved lens in front of the SLM (see OpticsInfoBase, July 2009, "Experimental modules covering imaging, diffraction, Fourier optics and polarization based on a liquid-crystal cell SLM"). However, the reproduced image may be smaller than the original image. Another method is where the intensity of the $0^{th}$ diffraction component is lowered by using a polarizer in front of the SLM (see Otics Express, September 2008, "Hologram optimization for SLM-based reconstruction with regard to polarization effects"). In this case, the intensity of the reproduced image is also lowered. For still another method, the $0^{th}$ diffraction component can be eliminated by mechanical methods. However, in these cases, the reproduced image can be damaged or these methods cannot be available to large 3D images at all.

SUMMARY OF THE INVENTION

In order to address the above mentioned drawbacks and other limitations associated with the related art, one purpose of the present disclosure is to suggest a digital hologram image display device having enhanced 3D image quality by eliminating the $0^{th}$ diffraction component effectively.

In order to accomplish the above and other needs, the present disclosure according to an embodiment suggests a digital hologram image display device comprising: a pattern generator generating holography interference patterns; a spatial light modulator receiving the holography interference patterns from the pattern generator and representing the holography interference patterns; a light source positioning at one side of the spatial light modulator and illuminating a reference beam to the spatial light modulator; an optical device controlling the reference beam to be collimated onto a whole surface of the spatial light modulator; and a diffusion sheet disposed between the light source and the spatial light modulator.

The diffusion film can be disposed between the optical device and the light source.

The diffusion film can be disposed at next to the spatial light modulator.

The diffusion film can be disposed between the optical device and the spatial light modulator.

The optical device according to an embodiment comprises: an expander enlarging the cross-sectional area of the reference beam; and a lens system controlling the enlarged cross-sectional area of the reference beam to be corresponding to the whole surface of the spatial light modulator.

The spatial light modulator according to an embodiment includes a liquid crystal display panel having: a transparent upper substrate and a transparent lower substrate facing each other; and a liquid crystal layer disposed between the transparent upper substrate and the transparent lower substrate.

The light source according to an embodiment includes at least one of a laser diode and a collimated LED which are disposed at one side of the liquid crystal display panel, and the optical device includes an optical fiber having a light inlet connecting to the light source and a light outlet facing to the spatial light modulator.

The digital hologram image display device according to an embodiment further comprises an optical sheet between the spatial light modulator and the diffusion film.

In the digital hologram image display device according to an embodiment of the present disclosure, the $0^{th}$ diffraction component can be selectively and effectively eliminated. Particularly, without any distortion or deformation of the 3D image/video wanted to be reproduced, the intensity of the $0^{th}$ diffraction component can be lowered so that a clean 3D image/video can be acquired using a simple digital hologram image display device according to the present disclosure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A to 3D are 3D graphs illustrating the qualities of the image/video according to the various locations of the diffusion film according to an embodiment of the present disclosure.

DETAILED DESCRIPTION OF THE ILLUSTRATED EMBODIMENTS

Figure 1:
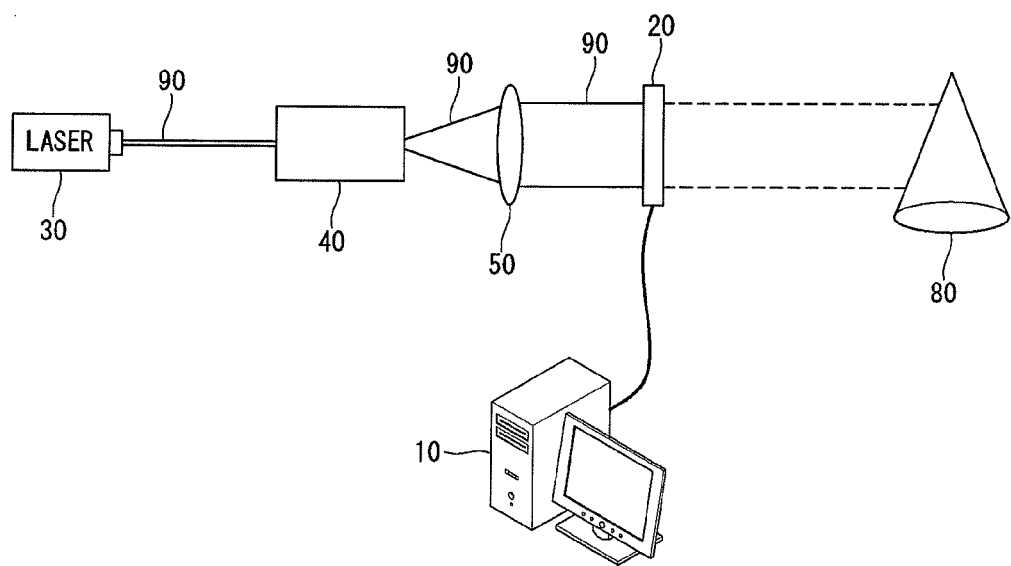
FIG. 1 is a structural drawing illustrating a digital holography image/video display device using a computer generated holography according to the related art.
Figure 2:
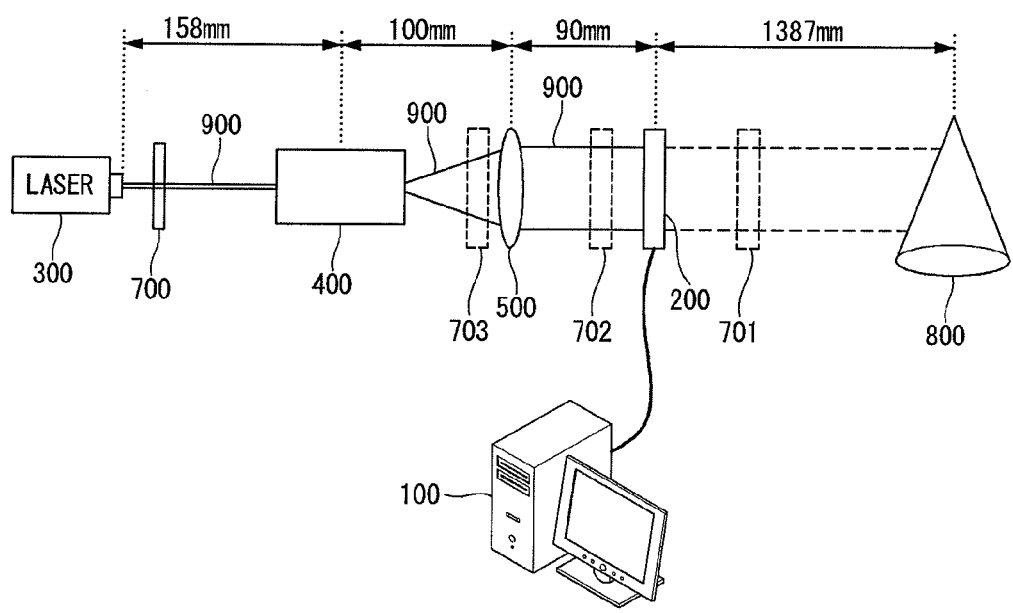
FIG. 2 is a structural drawing illustrating a digital holography image/video display device using a computer generated holography according to an embodiment of the present disclosure.
Figure 3A:
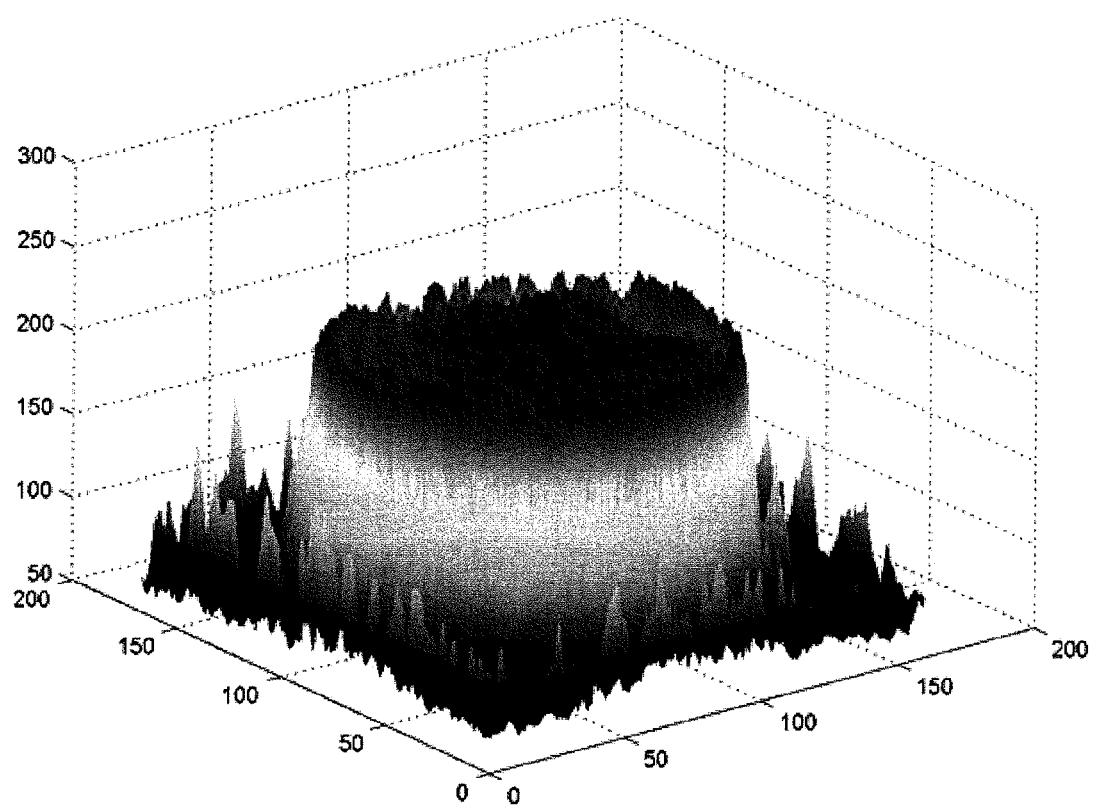
Figure 3C:
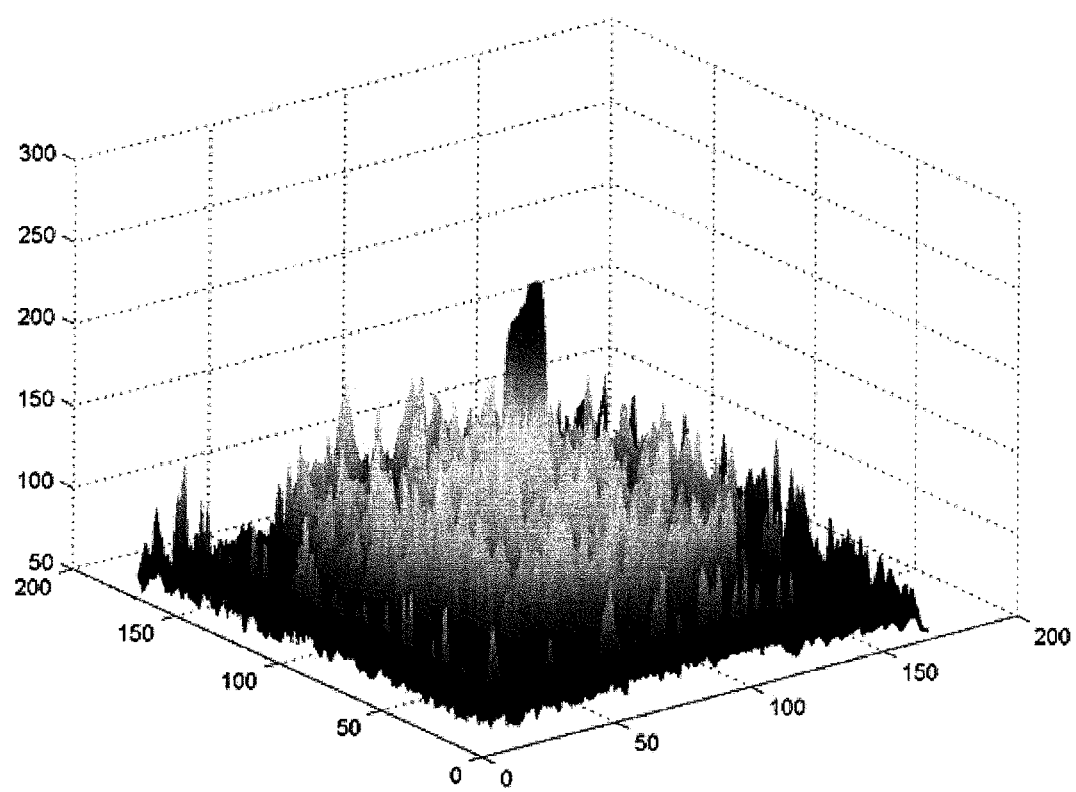
Figure 3D:
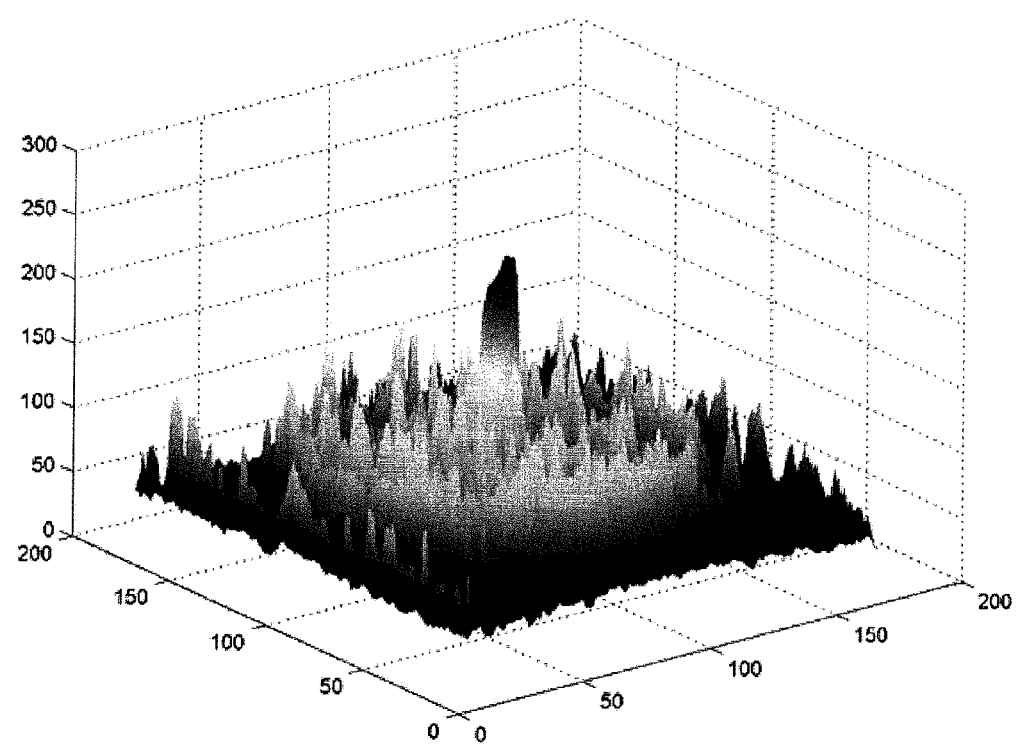
Figure 4:
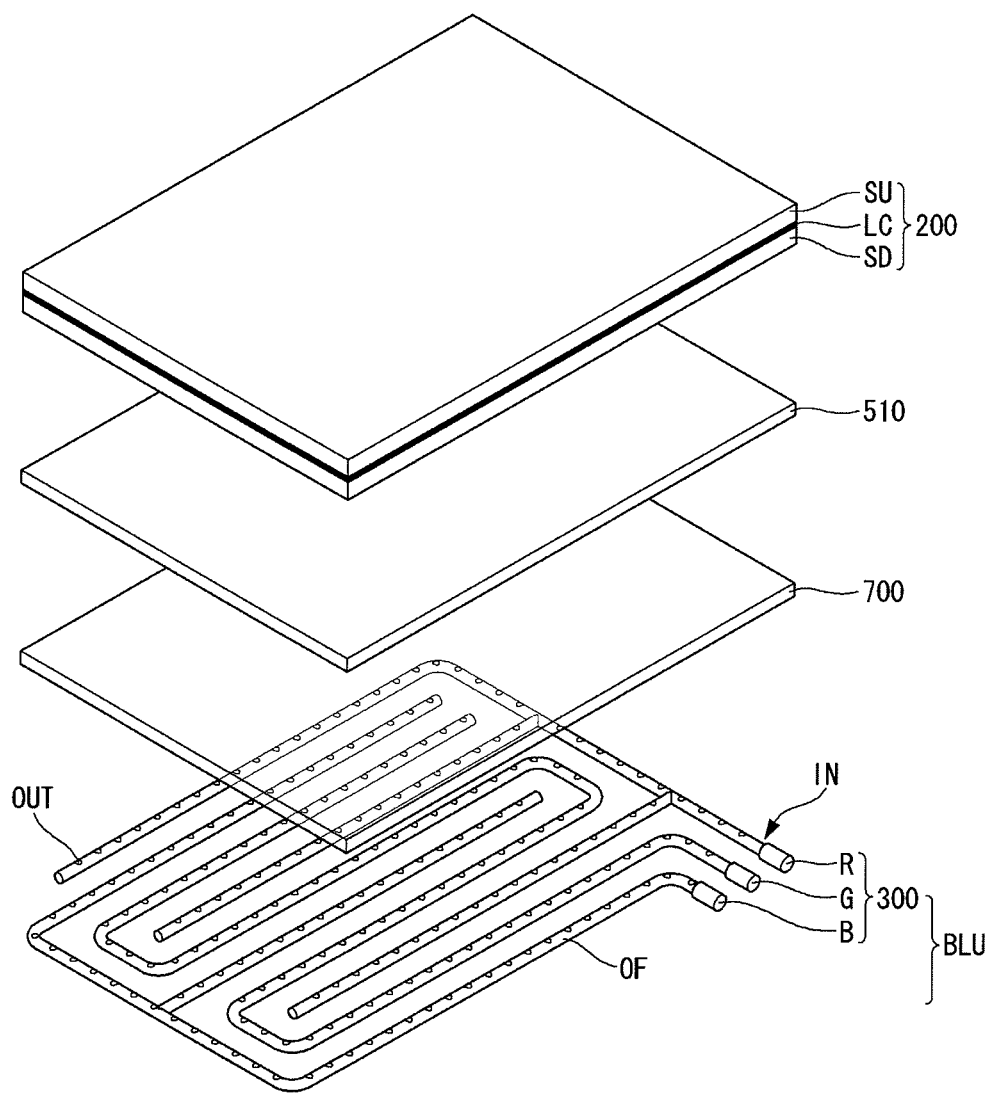
FIG. 4 is a structural drawing illustrating a digital holography image/video display device using a transmittive liquid crystal display device as a spatial light modulator of a computer generated holography according to an embodiment of the present disclosure.

Referring to the attached figures including FIGS. 2 to 4, an explanation of the preferred embodiments of the present disclosure will be provided. FIG. 2 is a structural drawing illustrating an example of a digital holography image/video display device using a computer-generated holography according to an embodiment of the present disclosure.

Referring to FIG. 2, the digital hologram image display device includes a computer (or processor) 100 for generating a holographic interference pattern of a 3D image/video data, and a SLM 200 receiving the holographic inference pattern from the computer 100 and representing the holographic interference pattern thereon. A light source 300 for generating a reference beam 900 is located at one side of the SLM 200. The reference beam 900 would preferably be a coherent light. Therefore, the light source 300 may include a laser source or a collimated LED. Between the light source 300 and the SLM 200, an expander 400 and a lens system 500 are disposed sequentially for illuminating the reference beam 900 to the entire surface of the SLM 200.

For example, the light source 300 and the expander 400 may be apart 158 mm from each other, and the expander 400 and the lens system 500 can be apart 100 mm from each other. Furthermore, the lens system 500 and the SLM 200 can be apart 90 mm from each other. The coherent light radiated from the light source 300 can be a reference beam 900 having a large diameter by the expander 400. The lens system 500 guides the reference beam 900 onto the entire surface of the SLM 200. In this case, a reproduced 3D image/video 800 can be displayed in the air at a location which is 1397 mm distanced from the SLM 200. The location of these components of the digital hologram image display device may be varied depending on the need or configuration.

In order to reduce the intensity of the $0^{th}$ diffraction component of the reference beam 900 which is not diffracted at the SLM 200 but is passing through the SLM 200, a diffusion film 700 is further provided between the light source 300 and the 3D image/video 800 at a proper position. Preferably, the diffusion film 700 can be located between the SLM 200 and the 3D image/video 800 (e.g., as indicated by a dotted line 701), between the SLM 200 and the lens system 500 (e.g., as indicated by a dotted line 702), between the lens system 500 and the expander 400 (e.g., as indicated by a dotted line 703), or between the light source 300 and the expander 400 (e.g., as indicated by the solid line in FIG. 2). As a variation, one or more diffusing films 700 may be disposed at one or more above-noted locations, at the same time. The digital hologram image display device preferably includes one or more of the components 100, 200, 300, 400, 500 and 700, and all the components of the device are operatively coupled and configured.

FIGS. 3A to 3D are 3D graphs illustrating examples of the qualities of the image/video according to the various locations of the diffusion film (700) according to the embodiments of the present disclosure. FIG. 3A is a 3D graph illustrating the case in which the $0^{th}$ diffraction component is not eliminated at all (e.g., the diffusing film 700 is not present in the digital hologram image display device as in the related art) so that the $0^{th}$ diffraction component has much stronger intensity than the reproduced image/video. That is, the correct 3D image/video cannot be properly observed.

FIG. 3B is a 3D graph illustrating the intensity of the image/video to be reproduced in which the diffusion film 700 is located right in front of the SLM 200 (e.g., between the SLM 200 and the image 800) according to the present disclosure. As the intensity of the $0^{th}$ diffraction component is reduced considerably so it is possible for the observer/viewer to recognize what is the 3D image/video. FIG. 3C is a 3D graph illustrating the intensity of the image/video to be reproduced in which the diffusion film 700 is located between the lens system 500 and the SLM 200. Here the intensity of the $0^{th}$ diffraction component is remarkably reduced so it is possible for the observer to clearly recognize what is the 3D image/video. FIG. 3D is a 3D graph illustrating the intensity of the image/video to be reproduced in which the diffusion film 700 is located right in front of the light source 300 (e.g., between the light source 300 and the expander 400). Here most of all $0^{th}$ diffraction components are eliminated so it is possible for the observer to completely enjoy the 3D image/video as the original one.

According to the best mode of the embodiments of the present disclosure, the digital hologram image display device can include a diffusion film 700 just in front of the light source 300 before the expander 400. As a result, it is possible to selectively eliminate the strength of the $0^{th}$ diffraction component only, whereby a high quality 3D image/video is reproduced.

Hereinafter, one example in which a 3D image display device using a transmittive liquid crystal display device according to an embodiment of the present disclosure is provided. FIG. 4 is a structural drawing illustrating an example of a digital holography image/video display device using a transmittive liquid crystal display device as a spatial light modulator of a computer generated holography according to an embodiment of the present disclosure. The above concept of FIG. 2, however, can be applied to other devices. Further, all the components of FIG. 4 are operatively coupled and configured.

Referring to FIG. 4, the SLM 200 is a transmittive liquid crystal display device. For example, the SLM 200 includes an upper substrate SU and a lower substrate SD which include transparent glass substrates and face each other, and a liquid crystal layer LC disposed therebetween. The SLM 200 receives holography interference patterns from the computer 100 or a video processor, and represents them on the display area. The upper substrate SU and the lower substrate SD can have a color filter layer and a plurality of thin film transistors, respectively. For instance, the upper and lower substrates SU and SD can be respectively a color filter substrate and a TFT array substrate.

Under the SLM 200, a backlight unit BLU having a light source 300 and an optical fiber OF is disposed. The light source 300 may include a set of laser diodes having a red laser diode R, a green laser diode G and a blue laser diode B, or other combination of colors as known. As a variation, the light source 300 may include a set of collimated LEDs having a red, green and blue collimated LEDs, or other combination of colors as known. That is, in other examples, the light source 300 may include a combination of other color light sources other than red, green and/or blue, or it may include a single light source such as a white laser diode or a white collimated LED. In this example, the light source 300 is a set of red, green and blue laser diodes, but can be of different color or type.

In order to guide the reference beam radiated from the light source 300 to the bottom surface of the SLM 200 evenly, an optical fiber OF can be used. For example, the laser diodes R, G and B are disposed at one side of the backlight unit BLU. Using the optical fiber OF, the laser beam illuminated from the laser diodes R, G and B can be guided in such a manner that the laser beams are distributed more uniformly on the entire bottom surface of the SLM 200. To do so, the optical fiber OF can run to pass over the entire plane area of the SLM 200. Furthermore, some portions of clad covering the core of the optical fiber OF are removed to form a plurality of light outlets for irradiating the laser beam so that it is possible to radiate the coherent light overall of the surface of the SLM 200. In lieu of or in addition to the optical fiber OF, other light distributing means such as a collimator, etc. may be used to more uniformly disperse the light from the diodes towards the SLM 200.

Comparing with FIGS. 3A-3D, in the digital hologram image display device shown in FIG. 4, the optical fiber OF plays a role of expander which distributes the reference beam to the plane surface of the SLM 200. As a variation, a separate expander 400 may be disposed above or in front of the light source 300. Further, in FIG. 4, an optical sheet 510 acting as the lens system 500 in FIG. 2 may be further included. For example, the optical sheet 510 can be inserted between the SLM 200 and the optical fiber OF to make the reference beam correspond to the plane surface of the SLM 200 and be coherent.

Furthermore, a diffusion film 700 for eliminating the $0^{th}$ diffraction component can be disposed between the upside of the light outlets OUT of the optical fiber OF and the bottom surface of the SLM 200. More preferably, the diffusion film 700 is disposed between the optical fiber OF and the optical sheet 510. In still another example, by forming the diffusion film 700 as small films, they may be disposed at the light inlets IN where the laser diodes R, G and B contact with the optical fiber OF, so that the coherent light not causing the $0^{th}$ diffraction component can be directly incident into the optical fiber OF.

In the digital hologram image display device structured according to the embodiments of the present disclosure, the holography interference patterns are represented on the SLM 200, which is the liquid crystal display panel. By illuminating the reference beam from the light source 300 of laser diodes R, G and B to the liquid crystal display panel, the 3D image/video can be reproduced in the air above the SLM 200. Further, due to the diffusion film 700, the $0^{th}$ diffraction component can be eliminated or reduced significantly and the excellent quality of 3D images/videos can be acquired using the present invention.

While the embodiments of the present invention have been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A digital hologram image display device comprising:
 a spatial light modulator configured to receive a holography interference pattern and represent the holography interference pattern;
 a light source positioned at one side of the spatial light modulator and configured to generate a reference beam, wherein the light source includes a laser diode and a collimated LED positioned at one side of the digital hologram image display device;
 an optical device configured to control the reference beam generated from the light source to collimate the reference beam onto an entire surface of the spatial light modulator to generate a 3D (3-Dimensional) image corresponding to the holography interference pattern, wherein the optical device includes an expander configured to enlarge a cross-sectional area of the reference beam, and a lens system configured to control the enlarged cross-sectional area of the reference beam to correspond to the entire surface of the spatial light modulator; and a diffusion sheet configured to selectively and effectively lower an intensity of a $0^{th}$ diffraction component of the reference beam used to generate the 3D image, wherein the diffusion sheet is disposed between the light source and the expander.

2. The digital hologram image display device according to claim 1, wherein the diffusion sheet is disposed immediately adjacent to the spatial light modulator.

3. The digital hologram image display device according to claim 1, wherein the light source and the expander are approximately 158 mm spaced apart from each other, the expander and the lens system are approximately 100 mm spaced apart from each other, or the lens system and the spatial light modulator are approximately 90 mm spaced apart from each other.

4. The digital hologram image display device according to claim 1, wherein the spatial light modulator includes a liquid crystal display panel having:

a transparent upper substrate and a transparent lower substrate facing each other, and a liquid crystal layer disposed between the transparent upper substrate and the transparent lower substrate.

5. The digital hologram image display device according to claim 4, wherein the optical device includes an optical fiber having a light inlet connecting to the light source and a light outlet facing the spatial light modulator.

6. The digital hologram image display device according to claim 5, further comprising:

an optical sheet between the spatial light modulator and the diffusion sheet.

7. The digital hologram image display device according to claim 1, wherein the 3D image is reproduced at a location which is approximately 1397 mm distanced from the spatial light modulator.

8. The digital hologram image display device according to claim 1, further comprising:

a pattern generator configured to generate the holography interference pattern and to provide the generated holography interference pattern to the spatial light modulator.

9. The digital hologram image display device according to claim 1, wherein the optical device includes an optical fiber extending in a certain configuration to correspond substantially to the entire surface of the spatial light modulator.

10. The digital hologram image display device according to claim 1, wherein the light source includes a plurality of laser diodes and the collimated LED.

11. The digital hologram image display device according to claim 10, wherein the optical device includes a plurality of optical fibers having light inlets connecting to the laser diodes and the collimated LED.

12. The digital hologram image display device according to claim 11, wherein the diffusion sheet includes a plurality of diffusion films disposed at the light inlets between the optical fibers and the laser diodes and the collimated LED.

* * * * *